United States Patent
Jákli et al.

(10) Patent No.: US 11,814,562 B2
(45) Date of Patent: Nov. 14, 2023

(54) ELECTRO-RESPONSIVE IONIC LIQUID CRYSTAL ELASTOMER

(71) Applicants: Kent State University, Kent, OH (US); The University of Akron, Akron, OH (US)

(72) Inventors: Antal Jákli, Kent, OH (US); Chenrun Feng, Kent, OH (US); Chathuranga Prageeth Hemantha Rajapaksha, Kent, OH (US); Vikash Kaphle, Kent, OH (US); Thein Kyu, Akron, OH (US)

(73) Assignees: KENT STATE UNIVERSITY, Kent, OH (US); THE UNIVERSITY OF AKRON, Akron, OH (US)

( * ) Notice: Subject to any disclaimer, the term of this patent is extended or adjusted under 35 U.S.C. 154(b) by 0 days.

(21) Appl. No.: 17/248,127

(22) Filed: Jan. 11, 2021

(65) Prior Publication Data
US 2021/0214613 A1    Jul. 15, 2021

Related U.S. Application Data

(60) Provisional application No. 62/958,847, filed on Jan. 9, 2020.

(51) Int. Cl.
| | |
|---|---|
| C09K 19/02 | (2006.01) |
| C09K 19/54 | (2006.01) |
| C08F 2/14 | (2006.01) |
| C08F 20/30 | (2006.01) |
| C08F 22/20 | (2006.01) |
| C08K 5/07 | (2006.01) |
| C08F 2/50 | (2006.01) |
| C09K 19/04 | (2006.01) |

(52) U.S. Cl.
CPC .............. *C09K 19/02* (2013.01); *C08F 2/14* (2013.01); *C08F 2/50* (2013.01); *C08F 20/30* (2013.01); *C08F 22/20* (2013.01); *C08K 5/07* (2013.01); *C09K 19/542* (2013.01); *C09K 2019/0448* (2013.01); *C09K 2019/546* (2013.01)

(58) Field of Classification Search
CPC ...................................... C09K 19/02
See application file for complete search history.

(56) References Cited

U.S. PATENT DOCUMENTS 8,883,896 B2 * 11/2014 Oshita ................ C08G 18/8025
524/561

FOREIGN PATENT DOCUMENTS

| WO | WO-2014172261 A1 * | 10/2014 | .............. A61L 27/18 |
| WO | WO-2018034621 A1 * | 2/2018 | ........... B32B 15/043 |

OTHER PUBLICATIONS

Tanmay Bera, Ernest J. Freeman, Jennifer A. McDonough, Robert J. Clements, Asaad Aladlaan, Donald W. Miller, Christopher Malcuit, Torsten Hegmann, and Elda Hegmann ACS Applied Materials & Interfaces 2015 7 (26), 14528-14535 DOI: 10.1021/acsami.5b04208 (Year: 2015).*

Feng et al., "Macromolecules Rapid Communications", 2019, 24 pages (Year: 2019).*

Feng, Chenrun et al., "Macromolecular Rapid Communications", Jul. 26, 2019, 24 pages.

* cited by examiner

*Primary Examiner* — Chanceity N Robinson
(74) *Attorney, Agent, or Firm* — Lippes Mathias LLP

(57) ABSTRACT

An ionic liquid crystal elastomer composition includes a liquid crystal elastomer; and an ionic liquid.

17 Claims, 11 Drawing Sheets

| Main-chain LCBs | | | | |
|---|---|---|---|---|
| Thiolene-based | LC | | | Magnetic field | ⊙ |
| Polyacrylate-based | Non-LC | | | Mechanical stress | × |
| Siloxane-based | LC | | | | × |
| Epoxy-based | Non-LC | | | Mechanical stress | × |

FIG. 11

ELECTRO-RESPONSIVE IONIC LIQUID CRYSTAL ELASTOMER

This application claims the priority benefit of U.S. Provisional Application No. 62/958,847 filed Jan. 9, 2020 and titled "ELECTRO-RESPONSIVE IONIC LIQUID CRYSTAL ELASTOMER," which is incorporated by reference in its entirety.

STATEMENT REGARDING FEDERALLY SPONSORED RESEARCH

This invention was made with government support under Grant Nos. DMR-1307674 and DMR-1502543, both awarded by the National Science Foundation. The government has certain rights in the invention.

BACKGROUND

Over the past few decades, there have been developments concerning soft robotics inspired by mimicking the actuation of soft structures in nature. Unlike traditional hard robots with limited degrees of freedom in discrete motions, soft robots using stimuli-responsive resilient materials can generate an infinite number of continuous shape deformations without causing damage to their payloads. Their compliant elasticity, good adaptability to external constraints and safety around humans give soft robotics potential applications in healthcare and artificial intelligence (e.g. artificial muscles, sensor skin and wearable exoskeletons). Polymer actuators including shape-memory polymers, dielectric elastomers, ferroelectric polymers, ionic electroactive polymers and liquid crystal elastomers are promising materials for soft robotics with lightweight, easy and low-cost manufacturing, high corrosion resistance and programmable deformations.

Among insulating polymer actuators, liquid crystal elastomers (LCEs), which combine the orientational order of liquid crystal mesogens with the soft elasticity of polymer networks, can produce extremely sensitive deformations in response to diverse external stimuli, such as light, heat and electric fields. In case of light-driven actuation, either the cis-trans photoisomerization of azobenzene based mesogenic group, or a decreased molecular order can induce large strains. In recent studies, thermally active nematic LCEs with hybrid alignments (i.e. the director is parallel to the surface at one substrate and perpendicular at the other) were made and large bending curvatures were achieved due to anisotropic thermal expansion coefficients on two sides of the film. By varying the alignment of anisotropic LCEs, the orientation and magnitude of resulting strains can be easily pre-programmed and precisely controlled for soft robotic devices. Though heat or light driven robots are feasible, it is more convenient to use actuators directly controlled by electricity, especially for portable devices.

One possibility to reach large electric field induced mechanical deformations is the use of dielectric heating that converts electric energy to heat and causes a deformation by reducing the director order. Recently, an up to 20% contraction was achieved by incorporating heat-conducting carbon black nanocomposites into LCEs and inducing heating by a 5-40 V AC field.

In case of electrically and thermally insulating LCEs the electric actuation requires the reorientation of the liquid crystal director that couples to shape changes. Ferroelectric SmC* liquid crystals have polar coupling to electric fields ($\sim P_o E$) and possess linear electromechanical (piezoelectric) effects. Especially large strain (up to 4%) can be achieved via the electroclinic effect at electric fields E<5 V/μm, but only in a narrow temperature range near the SmA*-SmC* phase transition. In case of nematic LCEs the director reorientation is achieved by dielectric coupling ($\sim \Delta \varepsilon E^2$), which requires a very large electric field (E>30 V/μm).

In ionic electroactive polymers (iEAPs), even weak low frequency or DC electric fields cause drift of ions in opposite directions, leading to an expansion (compression) at the side where the larger (smaller) ions move, causing considerable bending in thin iEAPs films. The disadvantages of iEAPs currently are the slow response, the need of patterned electrodes to achieve complex shapes, and the lack of multifunctionality.

It would be desirable to develop new compositions and films that overcome the aforementioned deficiencies of iEAPs and their films.

It would also be desirable to develop low voltage driven pre-programmable deformations for soft robotic actuators.

BRIEF DESCRIPTION

The present disclosure relates to ionic liquid crystal elastomer compositions. Films and devices including the compositions are also disclosed. Processes for producing the compositions, films, and devices are also disclosed.

The ionic liquid crystal elastomer composition generally includes a liquid crystal elastomer; and an ionic liquid.

The liquid crystal elastomer may be a reaction product of a reaction mixture comprising a monomer; a crosslinking agent; and an initiator.

In some embodiments, the monomer is an acrylate monomer, such as a monofunctional acrylate monomer. The monofunctional acrylate monomer may be

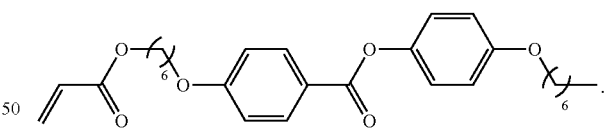

The crosslinking agent may be a bifunctional crosslinking agent.

In some embodiments, the bifunctional crosslinking agent is

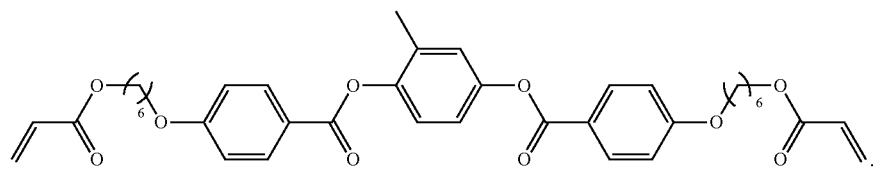

The initiator may be a photoinitiator.

In some embodiments, the photoinitiator is

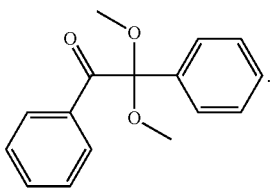

The ionic liquid may be

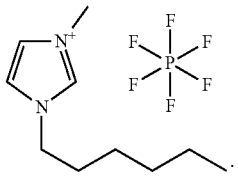

Disclosed, in further embodiments, is an ionic liquid crystal elastomer precursor composition including: a monomer; a crosslinking agent; and an ionic liquid.

In some embodiments, the precursor composition further includes an initiator.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 11 illustrates further non-limiting examples of liquid crystal polymer/monomer/crosslinker combinations.

DETAILED DESCRIPTION

Figure 1:
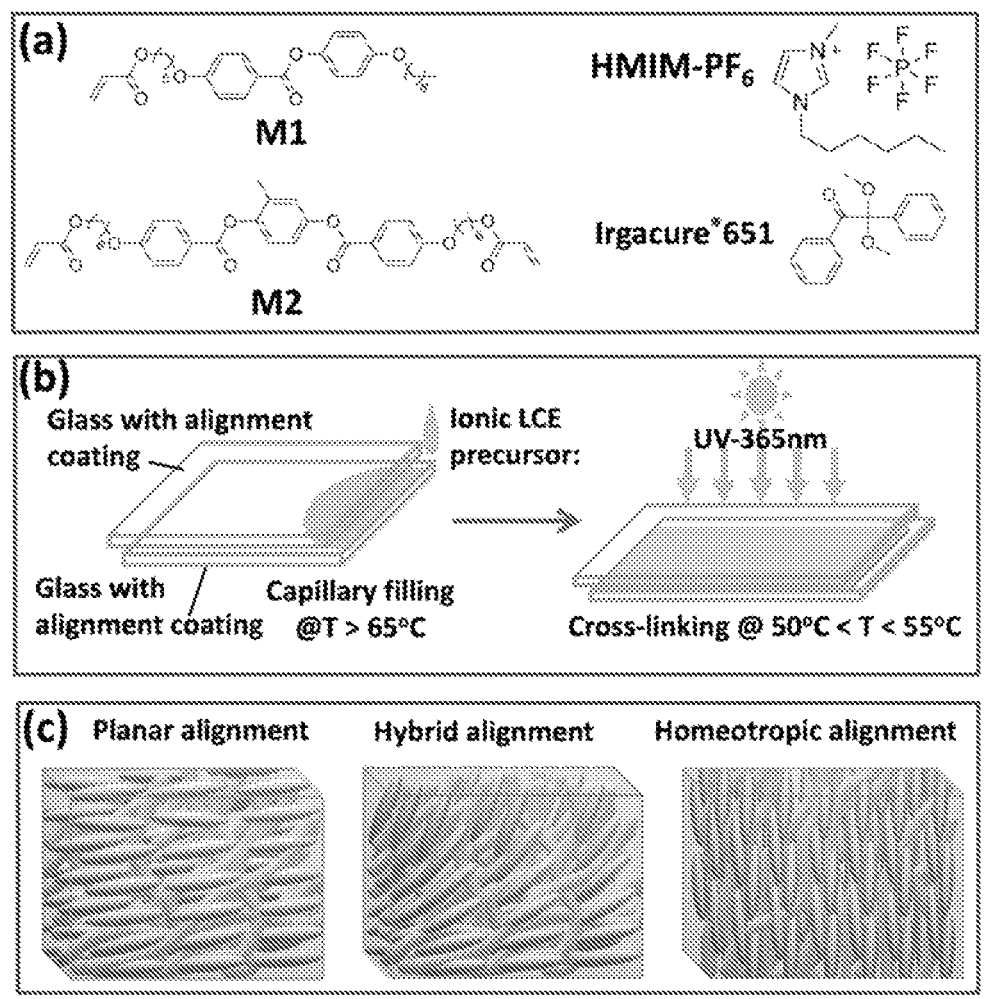
FIG. 1 summarizes the fabrication process and schematics of the structures of iLCEs. (a) Molecular structures of the components: M1 and M2 are mesogenic units, HMIM-PF$_6$ is the ionic liquid and Irgacure 651 is the photoinitiator. (b) Schematic process of an iLCE fabrication: capillary filling of iLCE precursor and cross-linking by photopolymerization in the nematic phase, (c) Illustration of the orientation of the mesogenic units and ionic channels for planar, hybrid and homeotropic alignments.

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Ionic liquid crystal elastomers (iLCEs), films thereof, devices containing the iLCEs and/or films, and methods for preparing and/or actuating the iLCEs, films, and/or devices are disclosed. The iLCEs can be actuated by low (~1V) voltages providing bending strains comparable to ionic electroactive polymers. The actuation is sensitive to alignment of the LCE director, offering surface pattern regulated bending shapes. Samples with hybrid alignment can combine thermal and electric actuation.

The present disclosure relates to ionic liquid crystal elastomers which can exhibit different bending strains by simply changing the alignment of liquid crystal mesogens before polymerization of the film. The ionic liquid crystal elastomers solve the limitation that the isothermal actuation of current liquid crystal elastomers require a very high electric field. The ionic liquid crystal elastomers of the present disclosure may be driven by voltages less than 1 V (e.g., less than 1 V DC/low frequency).

The ionic liquid crystal elastomer compositions of the present disclosure may be formed by dispersing ionic liquids into liquid crystal elastomers. Ionic liquid crystal elastomer films can be bent via the application of voltages less than 1 V. Additionally, the amplitude and switching time can depend on the alignment of liquid crystal mesogens. The bending strain of the ionic liquid crystal elastomers may be comparable to the best ionic electroactive polymer films. Additionally, ionic liquid crystal elastomers exhibit several improved features, such as alignment increasing the performance of actuation, the possibility of pre-programmed actuation pattern at the level of cross-linking process, and dual (thermal and electric) actuations in hybrid samples.

The ionic liquid crystal elastomers may be useful for devices including but not limited to biomedical surgical devices and portable or wearable soft robotics. The material components are biocompatible and non-toxic.

M1 as discussed herein may be a monofunctional monomer and may impart flexibility of the M2 network while sustaining the nematic phase through mutual alignment. Acrylate monomer (monofunctional acrylate, methacrylate, etc.) may be used as chain extended or side-branching to the liquid crystal network, but there is a possibility that the nematic-isotropic transition temperature may be suppressed to a lower temperature, which might limit the application temperature range of the nematic liquid crystal alignment.

M2 may be a multifunctional crosslinker (e.g., bifunctional, trifunctional, tetrafunctional, etc.). For example, RM257 may be considered as an alternative.

There is a wide range of liquid crystal elastomer materials that can be used instead of M1-M2. These are simply non-limiting examples.

For the monomer(s) M1, M2 don't have to be mono/bifunctional. All the liquid crystal polymer/monomers which can be polymerized into a solid film can replace M1/M2. M1/M2 are used as polymer matrix in iLCEs. In principle, any polymer or monomer which has liquid crystalline phase can be used as polymer matrix of iLCEs. They can be mainchain LC polymers, side chain LC polymers or combined networks.

Figure 10:
FIG. 10 illustrates non-limiting examples of liquid crystal polymer/monomer/crosslinker combinations.

Some typical liquid crystal polymer/monomer/crosslinker examples are provided in FIG. 10. Additional examples are provided in FIG. 11.

Non-limiting examples of photoinitiators include Irgacure® 651, Irgacure® 619, and Rose Bengal photoinitiator which can be cured using UV light (e.g., wavelengths of 350-360 nm) or visible green light (e.g., wavelength of 540 nm). Other examples of photoinitiators include bis(2,4,6-trimethylbenzoyl)-phenylphoshineoxide (Irgacure® 819), Azobisisobutyronitrile (AIBN), Benzoyl peroxide and peroxide derivatives.

Non-limiting examples of ionic liquids include 1-Hexyl-3-methylimidazolium bis(trifluoromethylsulfonyl)imide, HMIM-TFSI (trifluoromethylsulfonyl) imide), EMIM (ethyl methylimidazolium)-TFSI, AMIM-TFSI (1-allyl-3-methyl-imidazolium bis(trifluoromethylsulfonyl) imide), 1-Hexyl-3-methyl-imidazolium-hexafluorophosphate (HMIM PF6), EMIM-PF6, EMIM-Br, EMIM-I, etc. Ionic salts containing cations of different sizes and valences (i.e. Li+, K+, Mg+2, and Al+3), but with the same TFSI-anion may also be used.

The ionic liquid Ionic may have different sized cations and anions. Non-limiting examples:

Cations selected from lithium ion, sodium ion, potassium ion, calcium ion, magnesium ion, aluminum ion, iron ion, zirconium ion, imidazolium ions, 1-ethyl-3-methylimidazolium ion, 1-butyl-3-methylimidazolium ion, 1-allyl-3-methylimidazolium ion, 1-butyl-2,3-dimethylimidazolium ion, 1-decyl-3-methylimidazolium ion, 1-hexyl-2,3-dimethylimidazolium ion, 1-hexyl-3-methylimidazolium ion, 1-(2-hydroxyethyl)-3-methylimidazolium ion, 2,3-dimethyl-1-propylimidazolium ion, 1,3-dimethylimidazolium ion, 1-methyl-3-n-octylimidazolium ion, 1-methyl-3-propylimidazolium ion, 1-methyl-3-pentylimidazolium ion), ammonium ions, amyltriethylammonium ion, butyltrimethylammonium ion, ethyl(2-methoxyethyl)dimethylammonium ion, tetrabutylammonium ion), pyridinium ions, 1-butylpyridinium ion, 1-butyl-4-methylpyridinium ion), pyrrolidinium ions (1-butyl-1-methylpyrrolidinium ions, 1-ethyl-1-methylpyrrolidinium ions, 1-methyl-1-propylpyrrolidinium ions), phosphonium ions, and combinations.

Anions selected from chloride ion, bromide ion, hexafluoroarsenic ion, hexafluorophosphate ion (PF6-), tetrafluoroborate ion, perchlorate ion, trifluoromethanesulfonic ion ([CF3SO3]-), [N(C2F5SO2)2]-, [N(C4F9SO2)(CF3SO2)]-, bis(trifluoromethane)sulfonimide ion ([N(CF3SO2)2]-), bis(oxalato)borate ion ([B(CO2)]-), tetrafluoroborate ion (BF4-), bis(fluorosulfonyl)imide ion ([N(FSO2)2]-), nitrate ion, hydrogen sulfate ion, Al2O7-, Al3Cl10-, AlCl4-, trifluoroacetate ion, trifluoro(trifluoromethyl)borate ion, thiocyanate ion, dimethyl phosphate ion, and combinations thereof.

Also, two or more ionic liquids can be mixed together into iLCEs.

Non-limiting examples of ranges for the materials include: polymer/monomer: about 5 to about 95 wt %; and ionic liquid: about 5 wt % to about 50 wt %.

In some embodiments, 5 to 40 wt % of ionic liquid (including 15-25 wt % to achieve a bicontinuous SD (spinodal decomposition) structure) may be used, although phase separation is not necessary. Good actuation has been achieved with a new ionic liquid DMIM-TFSI with long hydrophobic alkyl chain mixed with liquid crystalline elastomer instead of HMIM-PF6 and it did not show phase separation.

The ratio between monomer and crosslinker is adjustable according to the mechanical strength desired. Increased crosslinker generally leads to increased stiffness.

In some embodiments, the amount of photoinitiator may be in the range of from about 1 wt % to about 2 wt %.

Ethylene carbonate (EC) and/or succinonitrile (SCN) may be used to dissociate the ionic liquids (IL) to generate the mobile cations and anions for polarization and depolarization. In some embodiments, a dissociative additive may be used with the M1/M2 system and a small amount of ionic liquid (e.g., less than 10 wt % or less than 5 wt %).

Plasticizers such as dinitriles, ethylene carbonate or propylene carbonate can be added into iLCEs for better ionic conductivity. Surfactants may also be included.

Further additives may also be included.

Ionic liquid crystal elastomers (iLCEs) can be actuated by low frequency AC or DC voltages (e.g. of less than 1 V). Such iLCEs exhibit several novel and superior features, such as the alignment that increases the performance of actuation, the possibility of pre-programed actuation pattern at the level of cross-linking process, and dual (thermal and electric) actuations in hybrid samples. Since liquid crystal elastomers are also sensitive to magnetic fields, and can also be light sensitive, iLCEs have far-reaching potentials toward multi-responsive actuations that may have so far unmatched properties in soft robotics, sensing, and biomedical applications.

The following examples are provided to illustrate the devices and methods of the present disclosure. The examples are merely illustrative and are not intended to limit the disclosure to the materials, conditions, or process parameters set forth therein.

Examples

The molecular structures, the schematics of the sample preparation and of the LCE director and ionic channel structures are illustrated in FIG. 1(a, b and c), respectively. Monofunctional acrylate monomer M1 ($T_{NI}$=113° C.), bifunctional crosslinker M2 ($T_{NI}$=65° C.) and photo initiator Irgacure® 651 were mixed together by 87:12:1 weight ratios as LCE precursors.

Figure 5:
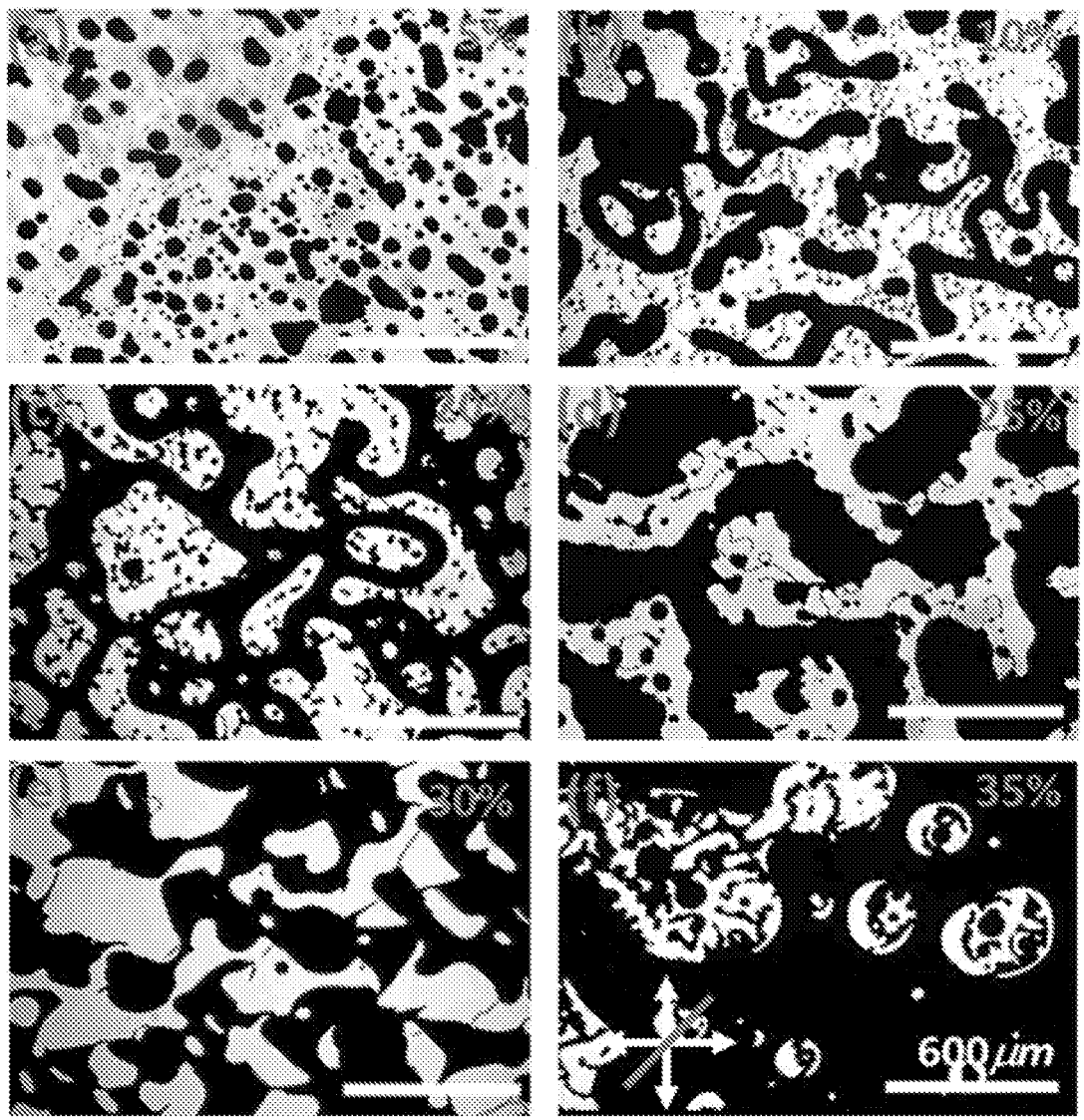
FIG. 5 includes Polarized Optical Microscopy (POM) textures of a 3 μm cells with planar alignment and 5-35 wt % IL added to precursor solution (M1/M2/Irgacure 651 composition with 87/12/1 weight ratios) at the nematic phase temperature range (~50° C.). Precursor solution and ionic liquid mixtures with a) 5%, b) 10%, c) 20%, d) 25%, e) 30%, and f) 35% ionic liquid concentrations. Length of scale bars is 600 μm.

Then the ionic liquid (IL, HMIM-PF6) was added at different weight percentages, forming the ionic LCE precursor solutions. After heating the ionic LCE precursor solutions to 100° C. in the isotropic phase and mechanically stirring for 15 minutes for complete mixing, the gap between two glass plates separated by 150 μm spacers and held together by mechanical clips, was filled at 100° C. Depending on the type of the inner coatings of the glass plates, the LC molecules were aligned either parallel (planar alignment) or perpendicular (homeotropic alignment) to both glass substrates, or planar in one and homeotropic on the other substrate (hybrid alignment). For planar alignment, a 10 nm thick film of polyimide (PI-2555, HD Micro Systems) was spin-coated on the glass surface and rubbed uniformly by velvet cloth after 1-hour baking at 80° C. For homeotropic alignment, glass substrates with 10 nm polyimide (SE-1211, Nissan Chemical Industries, Ltd) coating were baked without rubbing. On cooling to the nematic phase (50-55° C.), the liquid crystal molecules have separated from the isotropic IL molecules resulting in 10-100 μm size channels. The corresponding polarized optical microscopy (POM) textures of 3 μm cells with planar alignment are shown in FIG. 5. The schematics of the LC director alignment and the ionic channels are illustrated in FIG. 1(c).

The reactive monomers were photo-polymerized under 365 nm UV light (Black-Ray™, Model B-100AP/R) in the nematic phase (50-55° C.) for 30 min (FIG. 1(b)). For control purposes, cells that were crosslinked at 80° C., i.e. in the isotropic phase of the liquid crystal were also processed. After removing the clips, freestanding 150 μm thick ionic LCE (iLCE) films were peeled off from the cleaved glass substrates.

Poly(3,4-ethylenedioxythiophene) polystyrene sulfonate (PEDOT:PSS) with high flexibility and conductivity were used as electrodes. To optimize film morphology and conductivity, 0.25 vol % dodecyl benzene sulfonic acid (DBSA) and 5 vol % ethylene glycol (EG) was added to the aqueous solution of PEDOT:PSS (Clevios™ PH1000). Both sides of iLCE films containing 25% IL were spin coated at 1000 rpm. Afterwards, the coated film was placed on a heat stage at 120° C. for 30 min to evaporate water. The film with about 2-3 μm thick PEDOT:PSS coating (see FIG. 9) was cut into 20 mm long and 2 mm wide strips for further actuation measurements.

The electrodes may be placed on either side(s) of the substrate(s) and may or may not contact the alignment layer(s).

Figure 6:
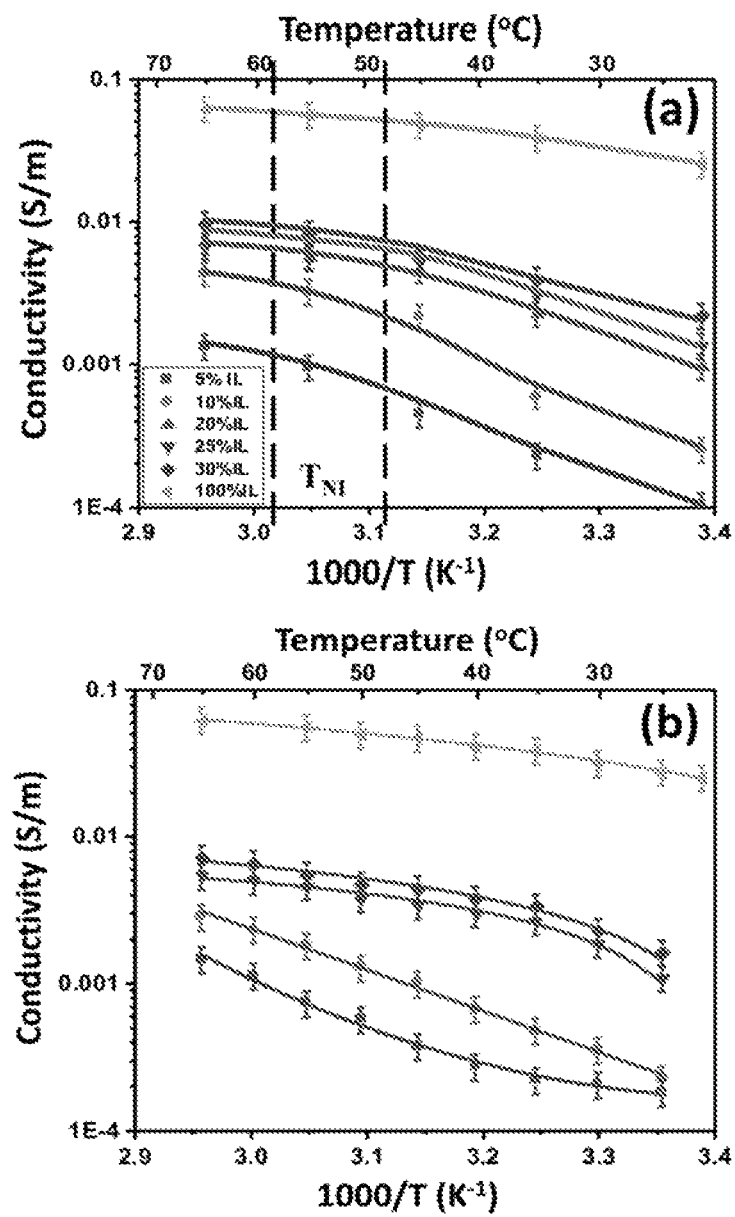
FIG. 6 shows ionic conductivity versus reciprocal temperature. (a): conductivities of ionic LCE mixtures before crosslinking. (b) conductivities of ionic LCE membrane after crosslinking. Grey squares, red dots, blue triangles, green triangles, purple and orange triangles represent conductivities at 5%, 10%, 20%, 25%, 30% and 100% IL concentrations, respectively.

The conductivities of iLCE precursors and crosslinked elastomers were measured by a precision impendence analyzer (SI 1260) as shown in FIG. 6 (a and b), respectively. It was found that the ionic conductivity of iLCE membranes with more than 25% ionic concentration can reach $10^{-3}$ S/m at room temperature. Considering the mechanical property and ionic conductivity of ionic LCEs, 25% ionic concentration LCE film was chosen for all bending performance measurements.

For actuation measurements one edge of the sample strip was sandwiched in between two 2 mm×2 mm brass electrodes and fixed by a clip hanging vertically. Thermal and electric actuations of the sample were captured by a CCD camera and analyzed by MATLAB image processing tools. For thermal actuations, the temperature was controlled by a transparent home-made heat stage. For electric actuations, a HP Harrison 6110A DC power supply and an Agilent 33120A function generator were used.

Thermal Actuation

Figure 2:
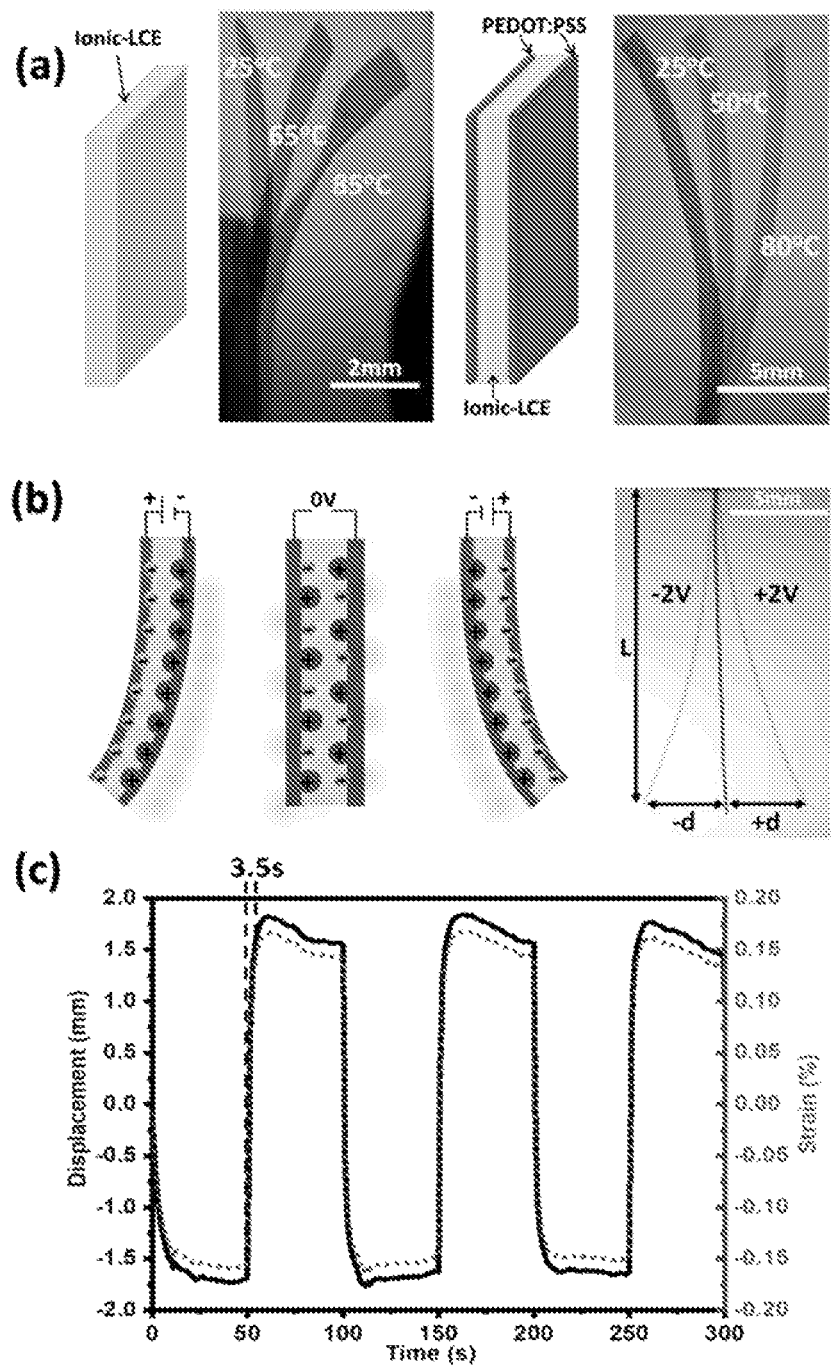
FIG. 2 is an illustration of thermal and electric actuations of a hybrid iLCE sample. (a) Thermal bending of a hybrid iLCE sample. Left side: without electrodes at 25° C., 65° C. and 85° C. temperatures; Right side: with electrodes at 25° C., 50° C. and 80° C. (b) Illustration of the principle of electric bending; Right: bending of a hybrid actuator under ±2 V DC voltages. (c) Time dependences of the tip displacement (left axis, solid) and strain (right axis, dots) of a hybrid actuator.

Due to the difference in thermal expansion coefficients on opposite sides of hybrid samples, one witnesses about 0.2% bending strain (see left side of FIG. 2(a)) for the 25% iLCE samples before PEDOT:PSS coating when the sample is heated from 25° C. to 85° C. After applying PEDOT:PSS electrodes on both sides of the iLCE film, this bending is suppressed by about 30% for the same 25% iLCE sample, as seen on the right side of FIG. 2(a).

No appreciable bending deformations were observed in cells with uniform planar and homeotropic alignments and samples that were crosslinked in the isotropic state.

Electric Actuation

Schematic illustration of the principle of electric field-induced bending of iLCE actuators is shown on the left side of FIG. 2(b). Just as for isotropic iEAPs, oppositely charged ions of ionic liquid with different size move toward opposite sides of the film when DC or low frequency AC voltage are applied on the compliant electrodes. The increased number of larger size ions occupy larger volume and exert extensional stress in one side of the actuator, while the increased number of smaller size ions exert compressional stress on the other side of the film. The strains and bending amplitudes will be determined by the Young's modulus and the architecture of the ionic liquid channels. Both of them depend on the alignment of the liquid crystal, so it appears alignment dependent voltage induced bending.

Overlaid images of the hybrid aligned iLCE actuator with PEDOT:PSS electrodes at zero and ±2 V applied are shown on the right side of FIG. 2(b). The time dependent tip displacement of the hybrid iLCE strip, measured by recording the movement frame by frame and analyzed by MATLAB image processing tools, is plotted in FIG. 2(c). One can see that the time to swing from one end point to the opposite one is 3.5 s. This time is related to the speed of the ion migration from one side to the other and is comparable to the swing time of typical iEAPs. The motion is strongly damped as only a small overshooting with about 20 s relaxation is seen in the time dependence of the displacement. This shows the viscoelastic nature of the iLCE actuator. To compare the actuators with iEAPs, the bending strain in the actuator was calculated by the equation:

$$\varepsilon = \frac{2dw}{L^2 + d^2}.$$

Here d is the tip displacement in horizontal direction, L is the free length of the film and w is the thickness of the strip with electrodes. As plotted on the right axis of FIG. 2(c), the overall bending strain in the hybrid aligned iLCE is about 0.3%, comparable to iEAPs.

Figure 3:
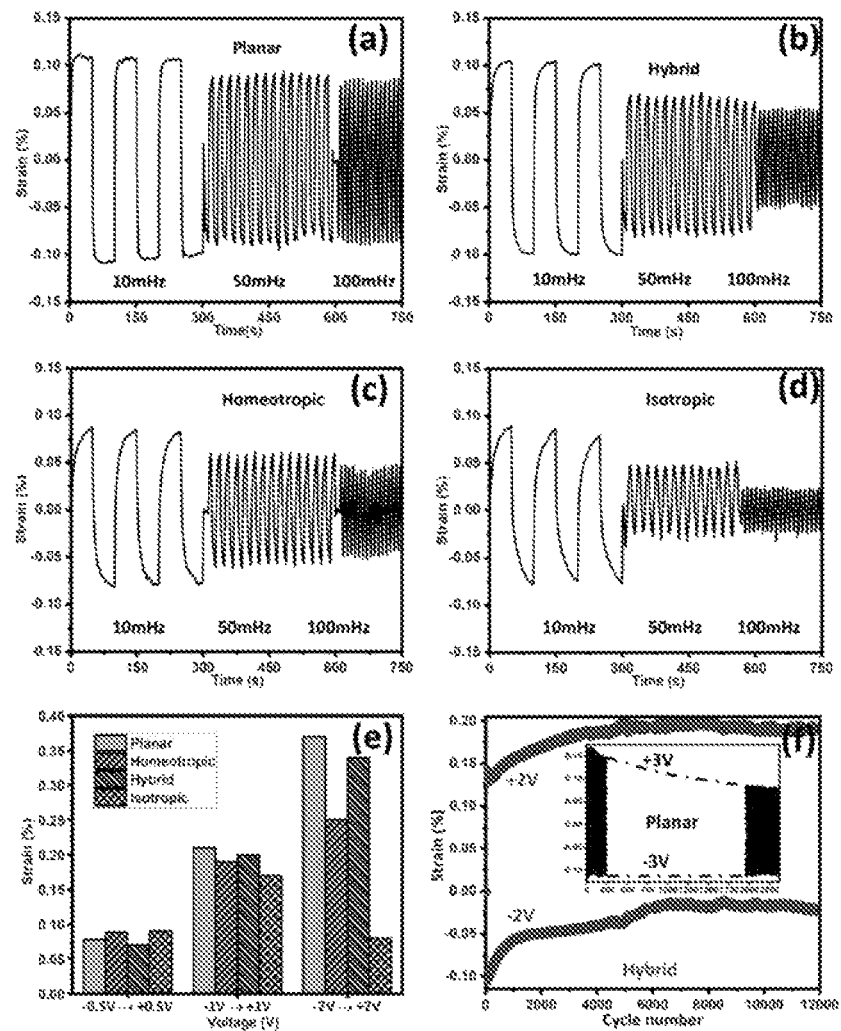
FIG. 3 shows the time dependences of the strains for 10, 50 and 100 mHz, 1V amplitude square wave actuations of iLCEs with planar (a) hybrid (b) and homeotropic (c) alignments crosslinked in nematic phase and that was crosslinked in the isotropic phase (d)). (e) Histogram showing the strains at different alignments and at different voltages. (f) Main pane: The strain of the hybrid actuator as the function of cycle numbers under +2 and 2 V of 100 mHz square-wave voltage. Inset: durability test for the planar actuator under ±3 V 50 mHz square-wave voltage.
Figure 4:
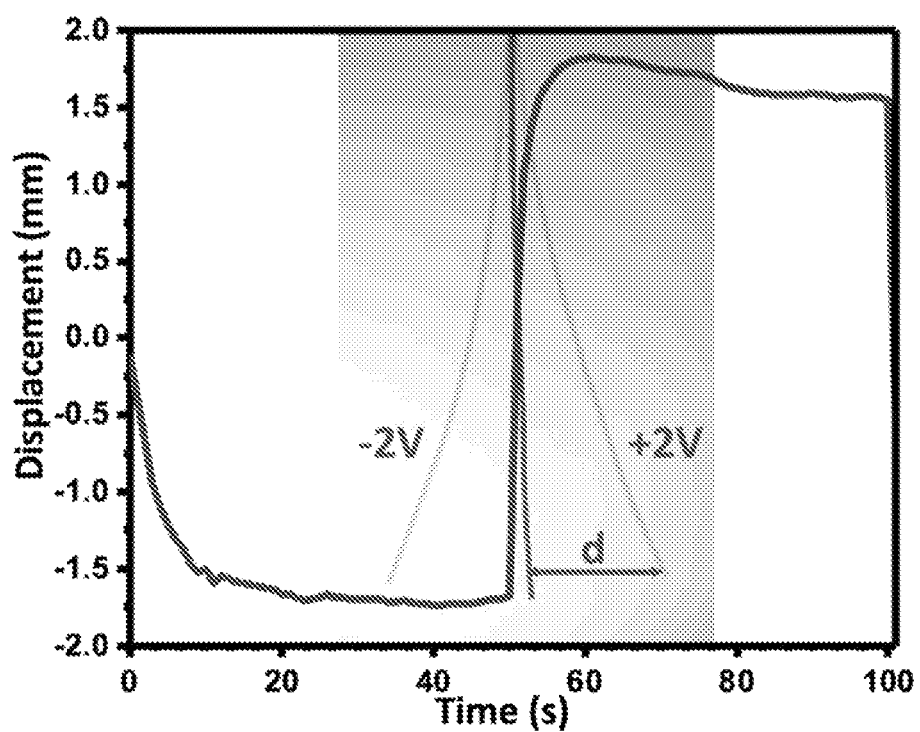
FIG. 4 is a graph showing displacement versus time.

FIG. 3 summarizes the time dependency of the strains for 10, 50 and 100 mHz, 1V amplitude square wave actuations of iLCEs crosslinked in the nematic phase (FIG. 3(a-c) with planar (FIG. 3(a)), hybrid (FIG. 3(b)) and homeotropic (FIG. 3(c)) alignments. and one sample shown in FIG. 3(d) that was crosslinked in the isotropic phase.

The bending actuation performances depend on the alignment of the iLCE films. On FIG. 3 one can see that the iLCE strip with planar alignment performs best and shows the largest bending stain, shortest response time and most durable bending for all three different frequencies. The hybrid iLCE strip performs between the planar and homeotropic alignment films. The isotropic iLCE shows the weakest performance with smallest and slowest bending. To find out what causes the observed alignment dependence of the actuation, the ionic conductivities and Young's moduli at different alignment conditions were measured (see FIG. 7 and FIG. 8). The bending performances were found to relate mainly to the ionic conductivity values that are smaller (3.27 mS/m) for the iLCE that was crosslinked in the isotropic state than those prepared in the nematic state, where the conductivities are 3.65, 3.73 and 3.84 mS/m for the homeotropic, hybrid and planar films, respectively (see FIG. 7). Under identical electric signals the actuators with high ionic conductivities will have more ions moving towards electrode sides, thus causing larger bending stress. The switching time is also correlated to the ionic conductivity: fastest for planar and slowest for isotropic. The Young's moduli are 9.7, 10 and 8 MPa for the homeotropic, planar and hybrid actuators, respectively (see FIG. 8). This means their differences do not play a major role in determining the electrically induced bending.

The large difference between the planarly aligned and the isotropic iLCEs highlights the advantage of aligned ionic liquid crystals over isotropic electroactive rubbers. It also offers a simple way of achieving pre-programmed shape change by using a patterned photomask during cross-linking. The area not covered by the mask can be crosslinked by UV in the nematic phase, that is followed by a whole area UV irradiation after the sample is heated to the isotropic phase. Such patterned actuations have already been shown for LCEs, but only by thermal and optical excitations.

Interestingly, the ratios of the bending amplitudes of the differently aligned actuators also depend on the magnitude of the applied voltage. This is shown in the histogram of FIG. 3(e), where the overall bending strains are compared for 10 mHz square wave voltages. While at low (0.5 V) voltage the isotropic and homeotropic samples performed slightly better than of the planar and hybrid samples, at 2 V the bending of the isotropic sample is 5 times smaller than of the planar sample. This behavior is correlated to the shape and connectivity of the phase separated ionic-rich domains that was observed (in >1 µm range) in optical microscopy images of the cross-section surface of the actuators by (see FIG. 9). It was found that in the isotropic iLCE, the IL rich domains are much more isolated, and a much smaller number of ionic channels connect the electrodes in the isotropic sample compared to samples crosslinked in the nematic phase.

The durability of the iLCE actuators was tested by applying more than 10 thousand cycles of ±2 V, 100 mHz square wave voltage in the hybrid sample (main pane of FIGS. 3(f)) and 2300 cycles of ±3 V, 50 mHz square wave voltage in the planar sample (inset of FIG. 3(f)). The equilibrium position of the tip of the strip drifted toward the planar side (static bending) in the first 2000 cycles for the hybrid sample. The static bending is permanent and does not relax back after the voltage has turned off, thus excluding the possibility of thermal bending due to possible electric current related heating. The electric heating was measured by remote infrared temperature sensor and was found to be below the error (~1° C.) of the sensor. The swinging amplitude decreases by about 10% in the first thousand cycle, but later both the drift and the decrease of the amplitude slowed down and the retention ratio after 10 k cycles was found to be still over 85%. This behavior represents durability comparable with the majority of iEAPs. The initial decrease of the strain is most probably due to quick shading of loosely connected electrode areas at the beginning, while properly bound PEDOT:PSS parts remain intact for very large number of cycles.

In case of the planar iLCE actuator the swinging amplitude decreased by about 20% after 2300 cycles, but the maximum position for −3 V remained the same. This behavior is likely due to the anisotropic phase separation (see FIG. 9) related to the anisotropic crosslinking, since the sample was illuminated by UV from one side and its intensity decreases across the film due to macroscopic phase separation.

Morphology of Liquid Crystal and Ionic Liquid

The monomers M1: 4-(6-Acryloxy-hex-1-yl-oxy)phenyl-4-(hexyloxy)benzoate and M2: 1,4-Bis-[4-(6-acryloyloxy-hexyloxy)benzoyloxy]-2-methylbenzene were purchased from Synthon Chemicals. The Ionic Liquid (IL): 1-Hexyl-3-methylimidazolium hexafluorophosphate (HMIM-PF6) and the photo initiator: 2,2-Dimethoxy-2-phenylacetophenone (Irgacure® 651) were purchased from Sigma-Aldrich.

Polarized Optical Microscopy (POM) textures of a 3 μm planarly aligned cells with 5-35 wt % IL added to precursor solution (M1/M2/Irgacure 651 composition with 87/12/1 weight ratios) are shown in FIG. 5 at 50° C. The rubbing direction of the aligning polymers is ±45° with respect to crossed polarizers. The precursor samples were first cooled to 25° C., then heated up 80° C. by 5° C./min and cooled back to 50° C. At low (5 and 10%) of IL concentrations [FIG. 5 (a and b)] dark (isotropic) droplets appear in the bright (birefringent) background indicating nucleation and spinodal decomposition. The isotropic domains should contain large amount of IL liquid, and the birefringent matrix is the precursor solution in nematic liquid crystal phase aligned along the rubbing direction. In the intermediate (20, 25 and 30%) concentrations (see FIG. 5 (c, d, e)) the isotropic droplets grow into bi-continuous ionic channels by spinodal decomposition. At and above 35% the isotropic areas become continuous and the liquid crystal forms separated droplets. From the area of the isotropic and birefringent phases, it was estimated that the isotropic liquid contains large amount (about 50%) of precursor solution.

Conductivity Measurements

For ionic conductivity measurements, the iLCE precursor solution was filled into a 25 μm thick cell with 25 mm² nickel electrodes patterned on two glass substrates. The complex impedance of iLCE precursor and crosslinked samples were measured by an impedance analyzer (SI1260, Schlumberger) sweeping from 200 Hz to 10 MHz. The impedance values of each sample were averaged over at least eight measured values. The ionic conductivities at different temperatures are calculated by the equation: σ=d/(AR) where d is the thickness of the sample, A is the surface area of the sample connected with electrodes, and R is the resistance of the sample. Ionic conductivities of unaligned iLCE are plotted against the reciprocal absolute temperatures (Arrhenius behavior) in FIG. 6(a). The slope of the curve is related to the activation energy of ion transportation. The conductivity values of the ionic precursors show slope changes at the crosslinking temperatures (~50° C.), indicating that the phase separation induced by the nematic phase transition facilitates ion mobilities. By increasing the amount of ionic liquid blended into the elastomer precursors from 0 to 30%, the ionic conductivities increase by an order of magnitude and the slopes of ionic conductivity curves decrease, getting closer to that of pure ionic liquid solution. The increase of the slope and conductivity with increasing ionic concentrations proves that the formation of ionic channels can help ion migrations.

The Arrhenius plots of the ionic conductivities of unaligned iLCE films after photo-polymerization are shown in FIG. 6(b). The ionic LCEs show ionic conductivities similar to their precursor solutions at nematic temperatures. This indicates the phase separated structure are fixed by crosslinking process. At high ionic concentrations, the conductivity curves of those films as well as pure ionic liquid can be fitted by Vogel-Tammann-Fulcher equation, $$\sigma = A\exp\left(-\frac{E_a}{R(T-T_0)}\right),$$

where A is a prefactor, $E_a$ is the activation energy, T is the actual temperature and $T_o$ is the Vogel temperature (typically 50° C. below polymer's glass transition temperature). At and above 20% IL content the ionic conductivity of iLCEs and their precursors have similar ionic conductivity values. These results prove the well-formed ion pathways across the LCE membrane with 20-30% ionic liquid.

Figure 7:
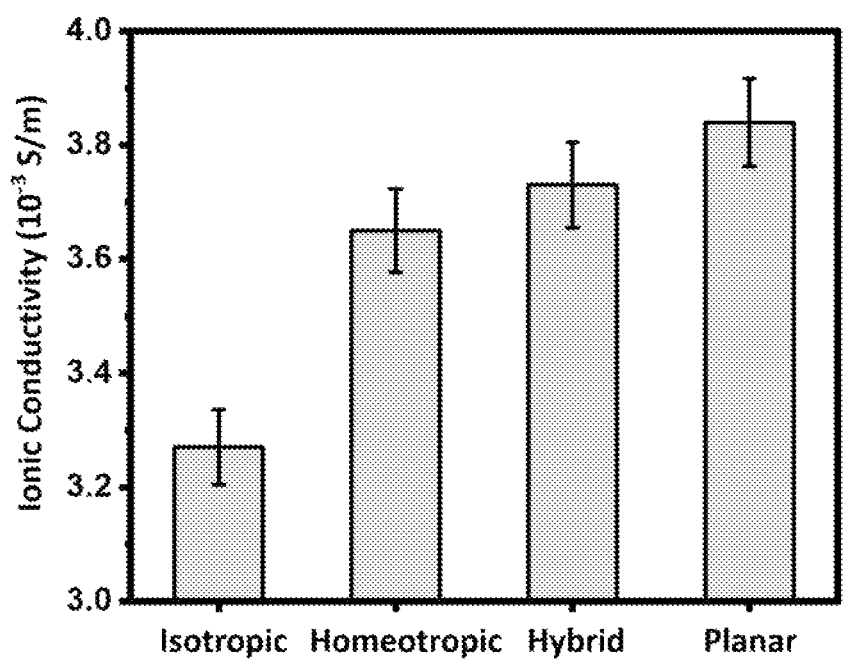
FIG. 7 is a graph showing Ionic conductivity of iLCE film with different alignments. iLCE samples with 25% ionic liquid concentration were used here. Samples are treated the same way as for actuators without PEDOT:PSS electrode coating.
Figure 8:
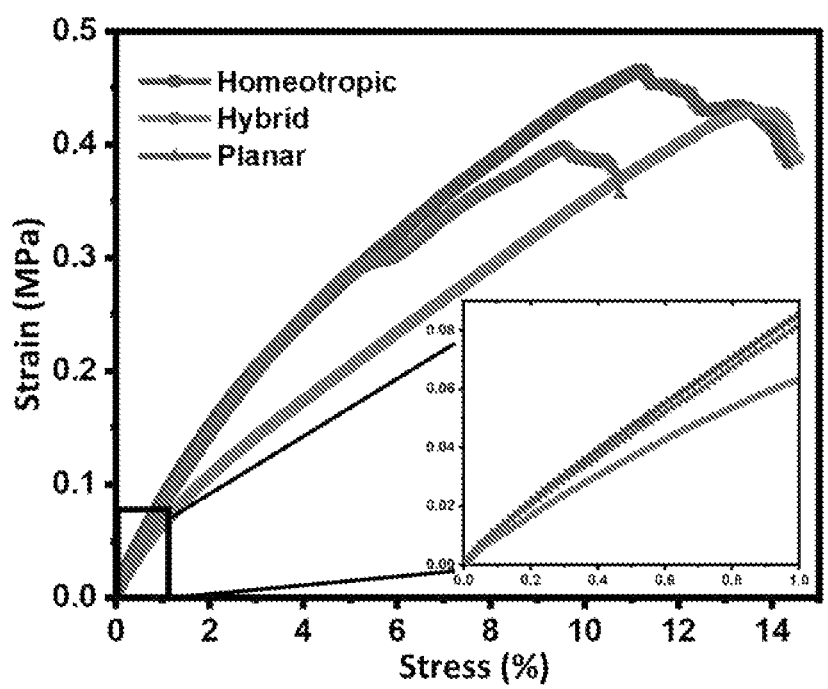
FIG. 8 shows stress vs strain plots of differently aligned iLCEs with PEDOT:PSS coating at room temperature. The inset shows the enlarged linear stress-strain region. The slope of the linear line gives the Young's modulus value of each sample. The grey square, red dot and blue triangle lines are tested from iLCE with homeotropic, hybrid and planar alignments, respectively.

In FIG. 7 the electric conductivity values measured at room temperature are plotted at four different samples: crosslinked in the isotropic phase (isotropic), with planar alignment on both substrates (planar), homeotropic alignment on both substrates (homeotropic) and planar alignment in one and homeotropic alignment on other substrate (hybrid). The results show that the planar iLCE has the highest, and the isotropic iLCE film has the lowest ionic conductivity. The conductivity of the hybrid cell is the average of the conductivities of the planar and homeotropic cells.

Young's Modulus Measurements

The stress-strain behavior of iLCEs with planar, homeotropic and hybrid alignments were tested by Dynamic Mechanical Analyzer (DMA-Q800, TA Instruments). Ionic LCE samples with PEDOT/PSS electrodes were stretched along the length of the film by 1% strain per minute. At low stress range the strain is proportional to the stress (see inset of FIG. 8) and the Young's modulus (Y) of each sample was calculated. It was found that $Y_{planar}$=9.7 MPa, $Y_{homeotropic}$=10 MPa and $Y_{hybrid}$=8 MPa. Further stretching the films, the electrode on planar iLCE broke faster than the other two. The hybrid iLCE have largest elongation before breaking among the three samples.

Microstructures of the iLCE Actuators

Figure 9:
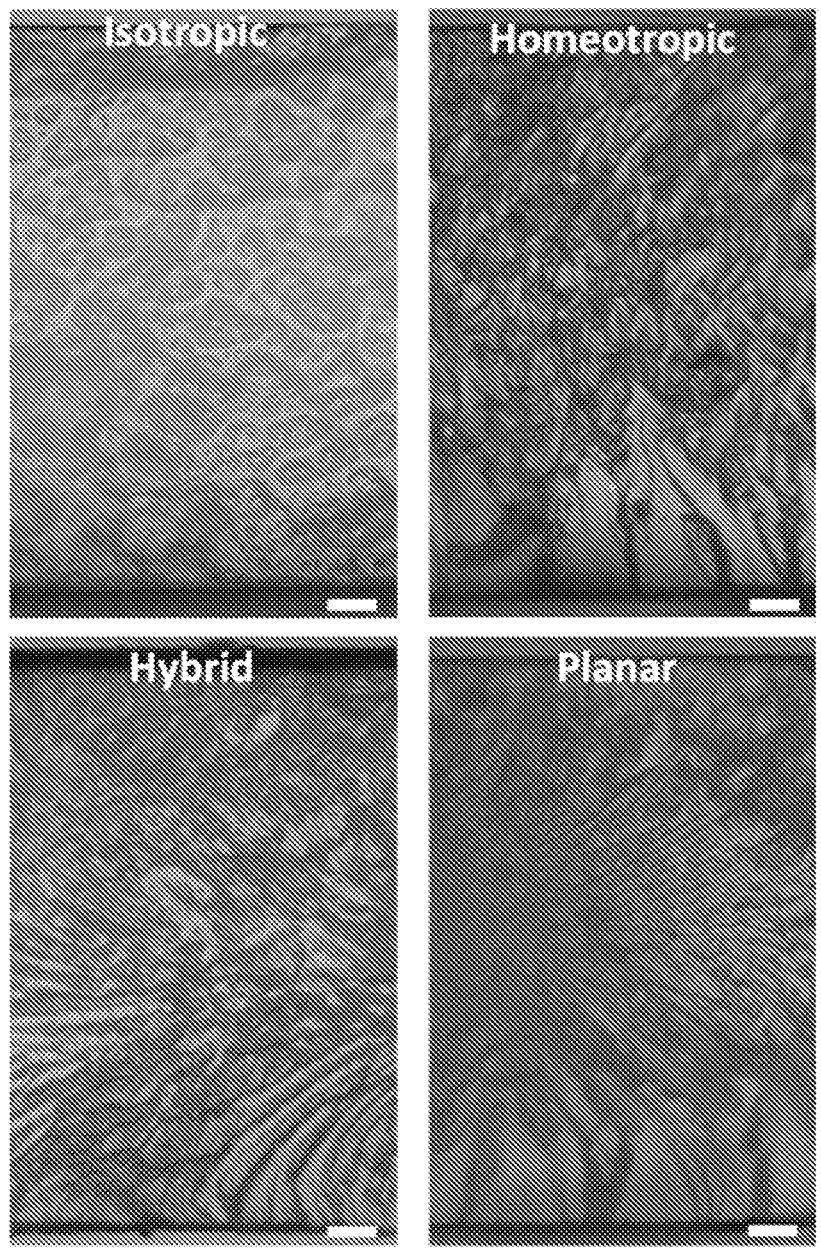
FIG. 9 includes microscopic pictures of cross-sections of iLCE actuators at room temperature. The black lines on two sides of the film are coated PEDOT:PSS electrodes. The microstructures between the electrodes are iLCE films with different alignments indicated in the individual pictures. The scale bars represent 10 μm length.

Microscopic pictures of the film's cross-section were taken by an optical microscope (Olympus BX51) for the isotropic, homeotropic, hybrid and planar cells and shown in FIG. 9, respectively. More or less aligned ionic channels are seen iLCE films crosslinked in nematic phases, while randomly positioned rarely connected domains of ionic liquid rich areas are seen for the cell crosslinked in the isotropic phase. Notably, the planar aligned film shows more continued ionic pathways on near the electrodes than the homeotropic film. This is consistent with the measured higher ionic conductivity of the planar cell than of the homeotropic (see FIG. 7).

The first ionic liquid crystal elastomers (iLCEs), their preparation, and electric bending actuation have been described herein, with emphasis on their morphology, ionic conductivity, and viscoelastic properties. It has been demonstrated that iLCEs can be actuated by low (<1 V) AC or DC voltages providing bending strains comparable to the well-developed ionic electroactive polymers (iEAPs) with several novel and superior properties. For example, the observation that aligned iLCEs perform better than of isotropic rubbers, offers patterned actuation pre-programed at the stage of cross-linking process. In principle, iLCEs offer multilevel (thermal, optical, magnetic and electric) actuations. Ionic liquid crystal elastomers therefore have far-reaching potentials toward multi-responsive actuations. It is also contemplated that light-sensitive moieties (e.g., azo and/or stilbene groups) could be added and/or magnetic fields could be applied.

The first ionic liquid crystal elastomers (iLCEs) have been characterized (electric conductivity, elastic modulus, morphology), whereby ionic liquid is added to LCE. Large bending actuation of nematic iLCEs by less than 1 V has been demonstrated. In addition, it has been demonstrated that iLCEs show several novel features that cannot be attained by isotropic polymers, such as dual (thermal and electric) responsiveness, and the possibility of pre-programmed complex actuation with uniform electrodes.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. An ionic liquid crystal elastomer composition comprising:
    a liquid crystal elastomer; and
    an ionic liquid;
    wherein the liquid crystal elastomer is a reaction product of a reaction mixture comprising a monomer; a cross-linking agent; and an initiator.

2. The ionic liquid crystal elastomer composition of claim 1, wherein the monomer is an acrylate monomer.

3. The ionic liquid crystal elastomer composition of claim 2, wherein the acrylate monomer is a monofunctional acrylate monomer.

4. The ionic liquid crystal elastomer composition of claim 3, wherein the monofunctional acrylate monomer is

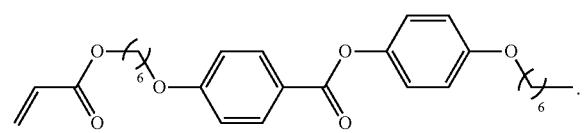

5. The ionic liquid crystal elastomer composition of claim 1, wherein the crosslinking agent is a bifunctional crosslinking agent.

6. The ionic liquid crystal elastomer composition of claim 5, wherein the bifunctional crosslinking agent is

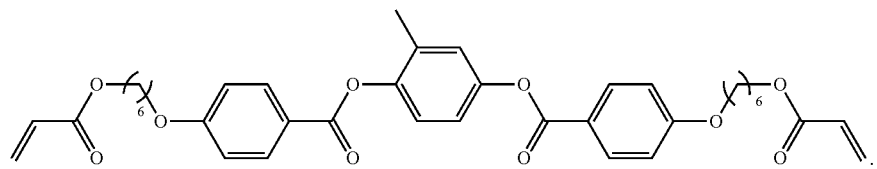

7. The ionic liquid crystal elastomer composition of claim 1, wherein the initiator is a photoinitiator.

8. The ionic liquid crystal elastomer composition of claim 7, wherein the photoinitiator is

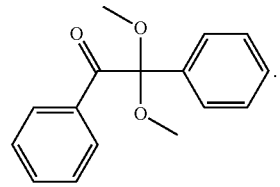 [SMILES: COC(OC)(C(=O)c1ccccc1)c1ccccc1]

9. The ionic liquid crystal elastomer composition of claim 1, wherein the ionic liquid comprises

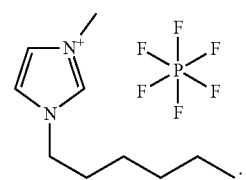

10. The ionic liquid crystal elastomer composition of claim 1, wherein the ionic liquid crystal elastomer comprises from about 5 wt % to about 95 wt % of the liquid crystal elastomer and about 5 wt % to about 50 wt % of the ionic liquid.

11. The ionic liquid crystal elastomer composition of claim 1, wherein the ionic liquid is selected from the group consisting of 1-Hexyl-3-methylimidazolium bis(trifluoromethylsulfonyl)imide, 1-Hexyl-3-methylimidazolium bis(trifluoromethylsulfonyl)imide, 1-allyl-3-methylimidazolium bis(trifluoromethylsulfonyl) imide, and 1-Hexyl-3-methyl-imidazolium-hexafluorophosphate.

12. The ionic liquid crystal elastomer composition of claim 1, wherein the ionic liquid comprises at least one ion selected from the group consisting of: lithium ion, sodium ion, potassium ion, calcium ion, magnesium ion, aluminum ion, iron ion, zirconium ion, imidazolium ions, 1-ethyl-3-methylimidazolium ion, 1-butyl-3-methylimidazolium ion, 1-allyl-3-methylimidazolium ion, 1-butyl-2,3-dimethylimidazolium ion, 1-decyl-3-methylimidazolium ion, 1-hexyl-2,3-dimethylimidazolium ion, 1-hexyl-3-methylimidazolium ion, 1-(2-hydroxyethyl)-3-methylimidazolium ion, 2,3-dimethyl-1-propylimidazolium ion, 1,3-dimethylimidazolium ion, 1-methyl-3-n-octylimidazolium ion, 1-methyl-3-propylimidazolium ion, 1-methyl-3-pentylimidazolium ion), ammonium ions, pyridinium ions, pyrrolidinium ions, and phosphonium ions.

13. The ionic liquid crystal elastomer composition of claim 1, wherein the ionic liquid comprises at least one ion selected from the group consisting of: chloride ion, bromide ion, hexafluoroarsenic ion, hexafluorophosphate ion, tetrafluoroborate ion, perchlorate ion, trifluoromethanesulfonic ion, bis(trifluoromethane)sulfonimide ion, bis(oxalato)borate ion, tetrafluoroborate ion, bis(fluorosulfonyl)imide ion, nitrate ion, hydrogen sulfate ion, trifluoroacetate ion, trifluoro(trifluoromethyl)borate ion, thiocyanate ion, and dimethyl phosphate ion.

14. A process for preparing the ionic liquid crystal elastomer composition of claim 1, the process comprising:
   polymerizing the monomer by reacting the reaction mixture to form the liquid crystal elastomer in the presence on the ionic liquid.

15. A process for producing a device comprising:
   forming the ionic liquid crystal elastomer composition of claim 1 between a first transparent substrate and a second transparent substrate.

16. The process of claim 15, further comprising:
   providing at least one electrode.

17. The process of claim 16, wherein the at least one electrode comprises: poly(3,4-ethylenedioxythiophene) polystyrene sulfonate.

\* \* \* \* \*